United States Patent [19]

Gryaznov et al.

[11] 4,132,668

[45] Jan. 2, 1979

[54] METHOD OF PREPARING A HYDROGEN-PERMEABLE MEMBRANE CATALYST ON A BASE OF PALLADIUM OR ITS ALLOYS FOR THE HYDROGENATION OF UNSATURATED ORGANIC COMPOUNDS

[76] Inventors: Vladimir M. Gryaznov, Lomonosovsky prospekt 14, kv. 504; Viktor S. Smirnov, Kutuzovsky prospekt 26, kv. 555; Valentin M. Vdovin, Leninsky prospekt 23, kv. 90; Margarita M. Ermilova, B. Cherkizovskaya ulitsa 10, korpus 2, kv. 103, all of Moscow; Lia D. Gogua, ulitsa Arakishvili 7, kv. 7, Tbilisi; Nina A. Pritula, 3 Frunzenskaya ulitsa 14, kv. 87; Igor A. Litvinov, ulitsa Delegatskaya 11, kv. 107, both of Moscow, all of U.S.S.R.

[21] Appl. No.: 785,052

[22] Filed: Apr. 6, 1977

[51] Int. Cl.² .................. B01J 31/28; B01J 31/06; C07C 5/16
[52] U.S. Cl. .................... 252/430; 208/143; 252/428; 252/477 R; 260/666 A; 260/677 H; 260/683.9; 260/690; 427/404; 427/447
[58] Field of Search .................... 252/430, 428, 477

[56] References Cited

U.S. PATENT DOCUMENTS

| | | | |
|---|---|---|---|
| 2,722,504 | 11/1955 | Fleck | 252/430 |
| 3,949,011 | 4/1976 | Smirnov et al. | 260/666 A |
| 3,950,447 | 4/1976 | Gryaznov | 260/677 |
| 3,965,210 | 6/1976 | Chu | 252/430 |
| 3,981,976 | 9/1976 | Stevens | 252/430 |

*Primary Examiner*—P. E. Konopka
*Attorney, Agent, or Firm*—Lackenbach, Lilling & Siegel

[57] ABSTRACT

The invention is related to a method of preparing a hydrogen-permeable membrane catalyst on a base of palladium or its alloys for the hydrogenation of unsaturated organic compounds.

According to the invention the surface of a metalloceramic sheet on a base of nickel, copper or stainless steel with a thickness from 0.05 to 1 mm is covered with an organosilicon polymer which is subsequently cured at a temperature ranging from 20 to 150° C.

The curing results in the formation of a film of the organosilicon polymer with a thickness from 0.01 to 1 mm, whereupon a layer of palladium or its alloy with a thickness from 0.001 to 0.1 micron is deposited on the polymer film.

The method of the invention allows decreasing by hundreds of times the consumption of palladium, and other noble metals such as ruthenium, rhodium, rhenium, silver, and gold.

7 Claims, No Drawings

METHOD OF PREPARING A HYDROGEN-PERMEABLE MEMBRANE CATALYST ON A BASE OF PALLADIUM OR ITS ALLOYS FOR THE HYDROGENATION OF UNSATURATED ORGANIC COMPOUNDS The present invention relates to methods of preparing catalysts, particularly to a method of preparing a hydrogen-permeable membrane catalyst on a base of palladium or its alloys, suitable for the hydrogenation of unsaturated organic compounds.

Hydrogen-permeable membrane catalysts are widely used for the reactions of hydrogenation, dehydrogenation, dehydrocyclization, hydrogen redistribution, hydrodealkylation, i.e. in processes involving evolution and absorption of hydrogen. All these reactions are widely applied in chemical industries and petroleum refining.

The advantage of the application of the membrane catalysts in chemical and petrochemical industries is determined by the possibility of carrying out two simultaneous processes without the mixing of the reaction products and with higher rates than with standard catalysts.

There is known a method for preparing a hydrogen-permeable membrane catalyst, which involves rolling into a foil palladium or alloys thereof, for example its alloys with ruthenium, rhodium, tungsten, nickel and other metals.

These alloys are prepared from powders of palladium and the second componet by thorough mixing thereof, followed by pressing and sintering. The melting is carried out in electric-arc furnaces with nonconsumable tungsten electrodes on a copper hearth cooled by water. The furnace chamber is evacuated to a pressure of $3.10^{-5}$ mm Hg and subsequently is filled with purified helium at a pressure of 450 mm Hg. The homogeneity of the product is achieved by repeated remelting. Finally the prepared alloy is rolled into a foil with a thickness from 0.05 to 1 mm.

The main disadvantage of the abovesaid method for preparation of the membrane catalyst is its large consumption of expensive noble metals.

It is the object of the present invention to provide a method of preparation of a hydrogen-permeable membrane catalyst with a decreased consumption of noble metals.

This and other objects are achieved by providing a method of preparation of a hydrogen-permeable membrane catalyst on a base of palladium or its alloys for the hydrogenation of unsaturated organic compounds, whereby the surface of a metalloceramic sheet with a thickness from 0.01 to 1 mm on a base of nickel, copper or stainless steel is covered with an organosilicon polymer which is subsequently cured at a temperature within the range of from 20° to 150° C. to form a polymer film with a thickness of 0.1 to 1 mm, after which the layer of palladium or its alloy with a thickness from 0.001 to 0.1 micron is deposited on the film of the cured polymer.

The herein-proposed method allows decreasing the consumption of palladium and other noble metals (for example ruthenium, rhodium, rhenium, silver, gold) by hundreds of times, while retaining all the advantages of membrane catalysts over catalysts of other types.

The recommended organosilicon polymers include polyorganosiloxanes (mainly polydimethylsiloxane) and polyorganosilcarbanes (mainly methylphenylsiltrimethylene polymer).

These polymers are characterised by high thermostability, high adhesion to metals and selective hydrogen permeability.

The herein-proposed method of preparation of a hydrogen-permeable membrane catalyst is carried out in the following way.

The catalyst is prepared as a three-layer composite structure consisting of a strengthening layer of a metalloceramic material which functions as a gas-penetrable support, a thin layer of the abovesaid polymer film with selective hydrogen permeability and a catalytically active layer of palladium or its alloy deposited on the polymer film.

The abovesaid composite structure maintains its strength in spite of a decrease of the palladium layer thickness and the application of a thin polymer film gives this catalyst the advantage of selective hydrogen permeability.

The size of the metalloceramic sheet made of copper, nickel or stainless steel depends on the productive capacity and on the size of the reactor employed. The thickness of the strengthening support (usually from 0.05 to 1 mm) is determined by the requirements of gas-penetrability of the composite structure as a whole. An increase of the sheet thickness above 1 mm makes it difficult to seal off the sheet in the reactor due to the high brittleness of the thick metalloceramic sheets. The application of thin sheets (less than 0.05 mm) is limited by high gas-penetrability of the sheets.

According to the present invention, use is made of polyorganosiloxanes with high thermostability (up to a temperature of 300° C.), high gas-permeability (the hydrogen permeability is $3.9.10^{-6}$ cm$^3$.cm/cm$^2$.sec.atm), high elasticity, and high adhesion to metals. Polymethylsiloxanes, polyphenylsiloxanes and polymethylphenylsiloxanes can be most widely used for this purpose.

Polyorganosilcarbane compounds, such as methylphenyl-silmonomethylene methylphenylsildimethylene and methylphenylsiltrimethylene polymers can be used for this purpose as well.

To make the polymer film, the abovementioned organosilicon compounds are deposited uniformly on the metalloceramic sheet and subsequently are cured at temperatures in the range of 20° to 150° C.

The desired gas-permeability of the membrane catalyst can be obtained by variation in the thickness of the polymer film deposited in the range from 0.1 to 1 mm.

The duration and the temperature conditions of curing are selected depending on the polymer film thickness to provide suitable porosity and uniform coverage throughout the surface.

According to the invention, the layer of palladium or its alloy of a thickness from 0.001 to 0.1 micron is deposited on the polymer film. It can be done by vacuum sublimation using a wire made of palladium or its alloy or by plasma evaporation of the metals, or by means of chemical or anodic deposition.

The suitable alloys include alloys of palladium and ruthenium, rhodium, osmium, nickel, iridium, or alloys of palladium and silver, gold, copper, or alloys of palladium and metals of Group VI-b of the Periodic Table of Elements.

The resulting composite catalyst can be employed for the hydrogenation of unsaturated organic compounds (for example, cycloolefins, aromatic hydrocarbons).

The advantage of the present method for preparation of a hydrogen-permeable membrane catalyst is the significant saving of expensive metals through the application of the three-layer composite structure, with all the advantages of the membrane catalyst over other catalysts being retained. These advantages include the possibility of independent control of the surface concentrations of two reagents, the decrease of the adsorption competition of the reagents which limits the reaction rate in the case of standard catalysts, high chemical selectivity of the membrane catalysts, the possibility of the conjugation of the hydrogenation reactions with any other hydrogen-evolving reaction resulting in the acceleration of both reactions without mixing of the reagents involved.

In particular, only membrane catalysts allow reaching the 92% yield of cyclopentene from cyclopentadiene at 100% conversion of the latter. The high conversion of cyclopentadiene in this reaction is very important because this substance is an active poison to the catalysts for cyclopentene polymerisation to synthetic rubber.

The composite membrane catalyst is characterised by less palladium enclosure in the reactor than is necessary to obtain the same amount of cyclopentene as compared with the membrane-foil catalyst. The strength of the composite membrane catalyst is higher than that of the foil catalysts made with palladium or its alloys and facilitates the construction of the reactors with membrane catalysts.

It is impossible to produce palladium foil catalyst with a thickness of 0.001–0.1 micron because of low mechanical strength of the membrane material. The deposition of palladium or its alloy on the solid strengthening sheet of a metal is of no use either, in view of the loss of the main advantage of a membrane catalyst.

The deposition of palladium alone on the surface of a metalloceramic material does not allow for producing continuous catalyst film, whereas only the continuous layer of palladium or its alloy gives the opportunity to use hydrogen in its active atomic state for hydrogenation reactions.

The application of the abovesaid polymer film provides for continuous coverage of the catalyst surface by active metal while maintaining suitable gas-permeability of the catalyst.

The palladium which is present in the membrane composite catalyst is not extracted by the reagents and can be completely reused for the preparation of a new catalyst if necessary.

Particular examples for realisation of the herein-proposed method are given below for a better understanding of the present invention.

EXAMPLE I

A metalloceramic sheet on a base of copper with the dimensions of $119 \times 20 \times 0.05$ mm was covered with a polymer composition containing polydimethylsiloxane, amino-substituted silane as a curing agent and zinc oxide as a filler.

The curing of the sample was carried out in air at a temperature of 22° C. for a period of three days, after which the sample was evacuated at a residual pressure of $10^{-3}$ mm Hg and a temperature of 70° C. for 3–4 hours, resulting in a polymer film with a thickness of 0.5 mm.

A layer of palladium with an effective thickness of 0.1 micron was deposited on the polymer film by evaporation in vacuo (residual pressure of $10^{-4}$ mm Hg).

The prepared membrane catalyst was sealed in a dynamic (flow-type) reactor. Hydrogen was admitted on one side of the membrane catalyst and a mixture of cyclopentadiene vapor and argon on the other side at a flow rate of 10 ml/min.

The partial pressure of cyclopentadiene in the reaction zone was 8.5 mm Hg and that of hydrogen, 11.4 mm Hg. The conversion degree of cyclopentadiene at 151° C. was 0.89 and the selectivity with respect to cyclopentene was 0.93.

EXAMPLE 2

A metalloceramic sheet on a base of nickel with the dimensions $119 \times 20 \times 0.1$ mm was covered with a polymer composition containing polydimethylsiloxane, amino-substituted silane as a curing agent and zinc oxide as a filler.

The curing of the sample was carried out in air at a temperature of 22° C. for a period of two days, after which the sample was evacuated at a residual pressure of $10^{-3}$ mm Hg and a temperature of 150° C. for one hour, resulting in a polymer film with a thickness of 0.1 mm, whereupon a layer of the palladium-nickel alloy (5.8 weight% of Ni) was deposited on the polymer film by evaporation in vacuo (residual pressure $10^{-4}$ mm Hg). The effective thickness of an alloy film was 0.001 micron.

When hydrogen was admitted in the dynamic (flow-type) reactor on one side of this membrane catalyst at a partial pressure of 23.6 mm Hg and a mixture of cyclopentadiene and argon on the other side of the membrane (partial pressure of cyclopentadiene 8.5 mm Hg) at a temperature of 127° C. and the flow rate of both reagents 10 ml/min the resultant degree of conversion of cyclopentadiene was 0.23 and the selectivity with respect to cyclopentene was 0.46.

EXAMPLE 3

A copolymer of 1,1-dimethyl-1-silacyclobutane and 1-phenyl-1-methyl-1-silacyclobutane with the comonomer ratio I:I.5 was obtained by thermoinitiated copolymerisation of the mixture of these monomers at a temperature of 150° C. for 4 hours. After the rolling of the unfilled copolymer it was laid on a metalloceramic sheet on a base of copper with the dimensions $119 \times 20 \times 1$ mm. The thickness of the polymer film was 0.4 mm.

An alloy of palladium and ruthenium (9.8 weight % of Ru) was deposited on the polymer film by evaporation in vacuo ($10^{-4}$ mm Hg). An effective thickness of the formed layer was 0.02 micron.

A hydrogenation reaction was carried out at 93° C. at a flow rate of a cylopentadiene-argon mixture 9.7 ml/min and at partial pressures of cyclopentadiene and hydrogen 8.6 and 11.4 mm Hg respectively. The cyclopentadiene degree of conversion was 0.12 and the selectivity with respect to cyclopentene was 0.90.

EXAMPLE 4

A metalloceramic sheet on a base of copper with the dimensions $119 \times 20 \times 0.5$ mm was covered with a polymer composition containing polydimethylsiloxane, amino-substituted silane as a curing agent and zinc oxide as a filler.

The curing of the sample was carried out in air at a temperature 22° C. for a period of two days, after which the sample was evacuated at a residual pressure of $10^{-3}$ mm Hg and a temperature of 20° C., resulting in a polymer film with a thickness of 0.3 mm.

A layer of a palladium-ruthenium alloy (9.8 weight % of Ru) was deposited on the polymer film in vacuo (residual pressure $10^{-4}$ mm Hg). The thickness of the formed layer was 0.02 micron.

This catalyst was tested at a temperature of 150° C. and a flow rate of a mixture of cyclopentadiene vapor and argon of 10 ml/min at the partial pressure of cyclopentadiene of 8.5 mm Hg and that of hydrogen, 11.4 mm Hg. 100% conversion of cyclopentadiene was obtained and the selectivity with respect to cyclopentene was 0.92.

Similar results on the cyclopentadiene formation and on the selectivity of its hydrogenation to cyclopentene were obtained with a foil membrane catalyst with a thickness of 0.1 mm and an apparent surface area of 18 cm² made of the same palladium-ruthenium alloy containing 9.8 weight % of ruthenium.

However, the weight of the foil catalyst was 2.16 g, whereas the composite catalyst contained $5.10^{-4}$ g of the palladium-ruthenium alloy only.

If the catalysts of equal activity are compared, the content of palladium and ruthenium in the composite membrane catalyst is one hundred times lower than that in the foil membrane catalyst made of the same palladium-ruthenium alloy.

EXAMPLE 5

A membrane catalyst was prepared by following the procedure described in Example I, but the support on a base of nickel with a thickness of 0.8 mm was employed instead of the metalloceramic sheet on a base of copper. The thickness of a polymer film made of polydimethylsiloxane was 0.5 mm.

The testing of the catalyst at a temperature of 120° C. and a flow rate of a mixture of cyclopentadiene vapor and argon of 10 ml/min at the partial pressure of cyclopentadiene of 32.4 mm Hg and that of hydrogen of 38 mm Hg resulted in the cyclopentadiene conversion degree of 0.96 and the selectivity with respect to cyclopentene 0.85.

EXAMPLE 6

A membrane catalyst was prepared by following the procedure described in Example I, using as a support a metalloceramic sheet on a base of stainless steel containing 16 to 18% of Cr and 14 to 15% of Ni, with a thickness of 0.5 mm , covered with a polymer film.

A layer of palladium-ruthenium alloy (9.8 weight % of Ru) with an effective thickness of 0.02 micron was deposited by evaporation on the polymer film.

Testing of the catalyst at a temperature of 120° C. and a flow rate of admittance of a mixture of cyclopentadiene vapor and argon of 10 ml/min and the parial pressure of cyclopentadiene of 8.5 mm Hg and that of hydrogen of 38.4 mm Hg resulted in 100% conversion of cyclopentadiene and the selectivity with respect to cyclopentene 0.79.

What we claim is:

1. A method for preparing a hydrogen permeable membrane catalyst for the hydrogenation of unsaturated organic compounds comprising:
    coating the surface of a metalloceramic material with an organosilicon polymer selected from the group consisting of polyorganosiloxanes and polyorganosilcarbanes, wherein said metalloceramic material is made of a substance selected from the group consisting of nickel, copper, and stainless steel, and has a thickness of about 0.05 to 1 mm; curing said polymer at a temperature of about 20° to 150° C. to form a polymer film having a thickness of about 0.1 to 1 mm; depositing a layer of a substance selected from the group consisting of palladium and palladium alloys to a thickness of about 0.001 to 0.1 micron on said polymer film.

2. The method of claim 1, wherein said layer of palladium or palladium alloy is deposited by means including vacuum sublimation, plasma evaporation, chemical deposition, or anodic deposition.

3. The method of claim 1 wherein said organosilicon polymer is selected from the group consisting of polydimethylsiloxane, methylphenylsiltrimethylene polymer, polymethylsiloxanes, polyphenylsiloxanes, polymethylphenylsiloxanes, methylphenylsilmonomethylene polymer, and methylphenylsildimethylene polymer.

4. A method as claimed in claim 3, wherein polydimethylsiloxane is used as the abovesaid polyorganosiloxane.

5. A method as claimed in claim 3, wherein methylphenylsiltrimethylene polymer is used as the abovesaid polyorganosilcarbane.

6. A catalyst formed by the method of claim 1.

7. A hydrogen permeable membrane catalyst assembly consisting essentially of:
    a first metalloceramic layer having a thickness of about 0.05 to 1 mm, made of a substance selected from the group consisting of nickel, copper, and stainless steel;
    a second organosilicon polymer layer cured at a temperature of about 20°-150° C. having a thickness of about 0.1 to 1 mm, said polymer being selected from the group consisting of polydimethylsiloxane, methylphenylsiltrimethylene polymer, polymethylsiloxanes, polyphenylsiloxanes, polymethylphenylsiloxanes, methylphenylsilmonomethylene polymer, and methylphenylsildimethylene polymer;
    and a third layer deposited on said second polymer layer, selected from the group consisting of palladium and palladium alloys, and having a thickness of about 0.01 to 0.1 micron.

* * * * *